(12) United States Patent
Hsieh et al.

(10) Patent No.: US 11,435,597 B2
(45) Date of Patent: Sep. 6, 2022

(54) DISPLAYING DEVICE

(71) Applicant: ASUSTEK COMPUTER INC., Taipei (TW)

(72) Inventors: Wen-Hao Hsieh, Taipei (TW); Kai-Ze Luo, Taipei (TW); Ming-Lung Lin, Taipei (TW); Yu-Chen Lee, Taipei (TW); Sheng-Yen Tseng, Taipei (TW); Yen-Hui Zheng, Taipei (TW); Kuan-Yi Lin, Taipei (TW); Chih-Shien Lin, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 169 days.

(21) Appl. No.: 16/719,563

(22) Filed: Dec. 18, 2019

(65) Prior Publication Data
US 2020/0201067 A1 Jun. 25, 2020

(30) Foreign Application Priority Data
Dec. 19, 2018 (TW) .................................. 107145973

(51) Int. Cl.
*G02B 30/50* (2020.01)
*G09G 3/00* (2006.01)

(52) U.S. Cl.
CPC .............. *G02B 30/50* (2020.01); *G09G 3/003* (2013.01)

(58) Field of Classification Search
CPC ........ G02B 30/50; G02B 30/52; G02B 30/54; G02B 30/56; G09G 3/003
See application file for complete search history.

(56) References Cited

U.S. PATENT DOCUMENTS

| 2004/0223049 | A1* | 11/2004 | Taniguchi | ........... H04M 1/0214 348/14.02 |
| 2011/0002038 | A1* | 1/2011 | Wang | ..................... G02B 30/56 359/479 |
| 2017/0347034 | A1* | 11/2017 | Iwasaki | .............. H04N 5/23245 |

FOREIGN PATENT DOCUMENTS

| CN | 102708767 | B | 9/2014 |
| CN | 206657636 | U | 11/2017 |
| CN | 108535991 | A | 9/2018 |
| TW | M473538 | U | 3/2014 |

* cited by examiner

*Primary Examiner* — Alexander Eisen
*Assistant Examiner* — Cory A Almeida
(74) *Attorney, Agent, or Firm* — Muncy, Geissler, Olds & Lowe, P.C.

(57) ABSTRACT

A displaying device adapted to a screen is provided. The displaying device includes a transparent pyramid, a movable support, and an image conversion unit. The movable support is connected to the transparent pyramid to move the transparent pyramid between a first location and a second location which is different from the first location. The first location is the position on the screen. The image conversion unit is configured to receive image data. When the transparent pyramid moves to the first location, the image conversion unit converts the image data to a holographic image displayed on the screen, and the transparent pyramid generates a 3D hologram based on the holographic image.

5 Claims, 6 Drawing Sheets

DISPLAYING DEVICE

CROSS-REFERENCE TO RELATED APPLICATION

This application claims the priority benefit of Taiwan Application Serial No. 107145973, filed on Dec. 19, 2018. The entirety of the above-mentioned patent application is hereby incorporated by reference herein and made a part of specification.

BACKGROUND OF THE INVENTION

Field of the Invention

The disclosure relates to a displaying device and, more particularly, to a displaying device with respect to displaying operating data of an electronic device.

Description of the Related Art

Traditionally, operating performance of an electronic device, such as CPU performance, the temperature variation, or cooling status, is showed by data provided through certain software. However, the software has to be installed by users in an operating system. Further, the operating performance data is showed only after a display screen of the electronic device is turned on and the software operates normally. Thus, it is inconvenient for usage.

BRIEF SUMMARY OF THE INVENTION

The disclosure provides a displaying device adapted to a screen. The displaying device includes a transparent pyramid, a movable support, and an image conversion unit. The movable support is connected to the transparent pyramid to move the transparent pyramid between a first location and a second location which is different from the first location. The first location is the position on the screen. The image conversion unit is configured to receive image data. When the transparent pyramid moves to the first location, the image conversion unit converts the image data to a holographic image displayed on the screen, and the transparent pyramid generates a 3D hologram based on the holographic image.

According to the disclosure, the displaying device converts image data into a 3D hologram to show according to a requirement of a user. The user directly views an operating state of the electronic device, and it increases the convenience.

Specific embodiments of the disclosure will be further described by using the following examples and drawings.

DETAILED DESCRIPTION OF THE EMBODIMENTS

Specific embodiments of the disclosure will be described in further detail below with reference to schematic drawings. The advantages and features of the disclosure will become more apparent from the following description and claims. It should be noted that the drawings are all in a very simplified form and are not drawn to accurate scale, but are merely used for convenience and clarity of description of the embodiments of the disclosure.

Figure 1A:
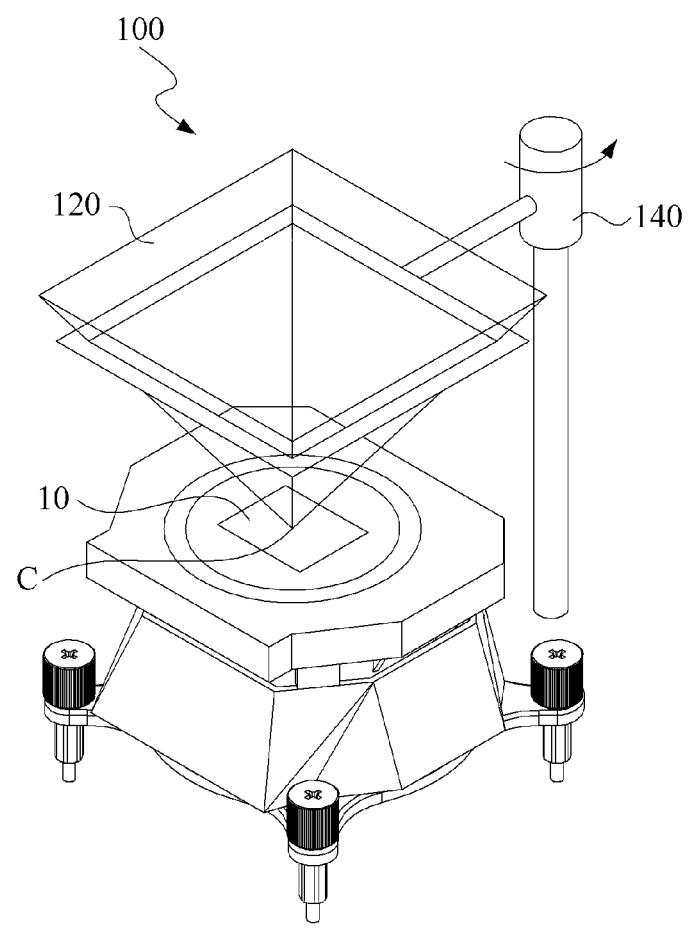
FIG. 1A and FIG. 1B are three-dimensional schematic views of an embodiment of a displaying device of the disclosure.
Figure 1B:
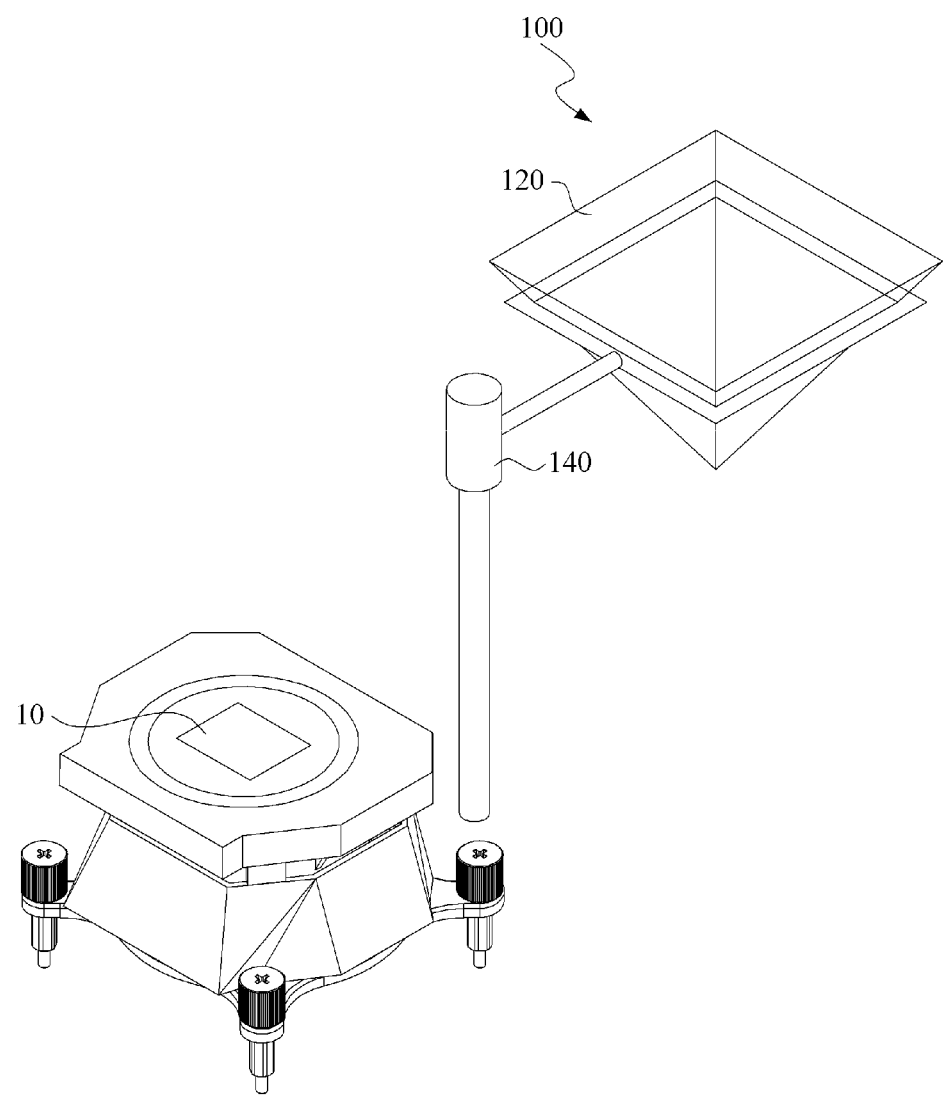
Figure 2:
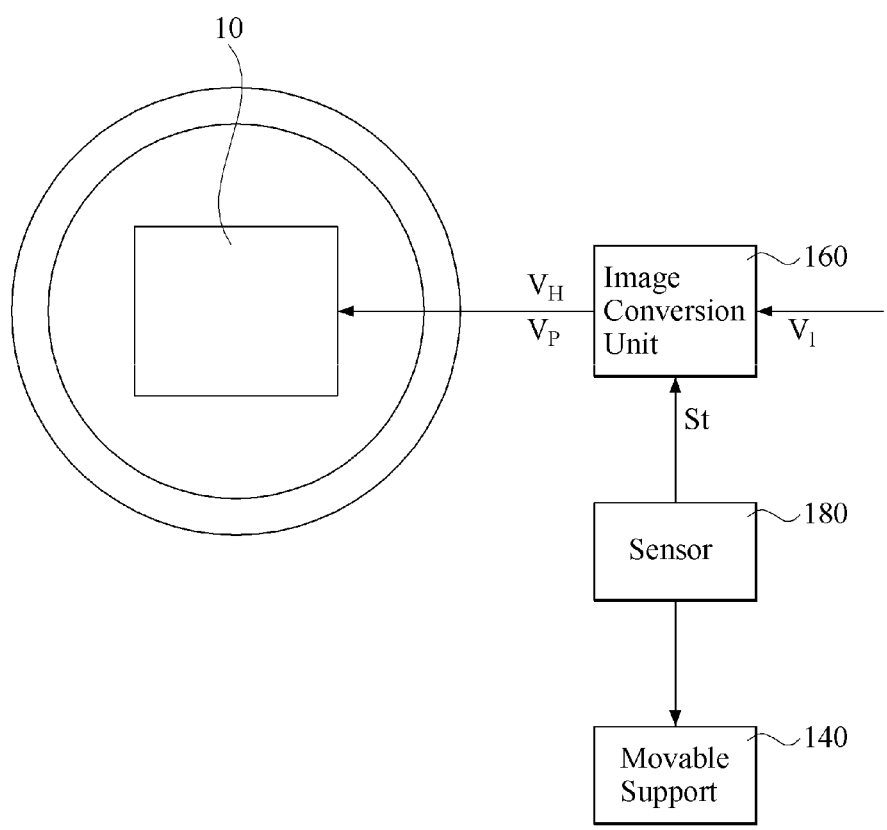
FIG. 2 is a square block schematic view of an embodiment of the displaying device of the disclosure.

FIG. 1A and FIG. 1B are three-dimensional schematic views of an embodiment of a displaying device of the disclosure. FIG. 2 is a square block schematic view of an embodiment of the displaying device of the disclosure. The displaying device 100 is adapted to a screen 10. The screen 10 is arranged in a cooling system or a motherboard in the electronic device to display operating data, such as temperature of the motherboard, operating frequency of a center processing unit, or a fan rotating speed of the cooling system.

In an embodiment, the displaying device 100 of the embodiment includes a transparent pyramid 120, a movable support 140, an image conversion unit 160 and a sensor 180.

In an embodiment, the transparent pyramid 120 is a quadrangular pyramid, and is configured to reflect an image displayed by the screen 10. The transparent pyramid 120 is a solid pyramid or a hollow pyramid. The transparent pyramid 120 is made of transparent materials such as glass or Acryl.

In an embodiment, the movable support 140 is connected to the transparent pyramid 120 to bear the transparent pyramid 120, so that the transparent pyramid 120 moves between a first location (as shown in FIG. 1A) and a second location (as shown in FIG. 1B). The first location is the position on the screen 10. The second location is the position far from the screen 10. In one embodiment, as shown in FIG. 1A, when the transparent pyramid 120 moves to the first location, the transparent pyramid 120 is inversely disposed and positioned at a center C of the screen 10. That is, a vertex point of the transparent pyramid 120 is aligned with the center C of the screen 10.

The image conversion unit 160 is configured to receive image data $V_1$, and is electrically connected to the screen 10 to determine an image displayed on the screen 10. In one embodiment, when the transparent pyramid 120 moves to the first location, as shown in FIG. 1A, the image conversion unit 160 converts the image data $V_1$ into a holographic image $V_H$ displayed on the screen 10. At the moment, the transparent pyramid 120 positioned on the first location generates a 3D hologram based on the holographic image $V_H$. Otherwise, when the transparent pyramid 120 is not positioned on the first location, in an embodiment, located at the second location as shown in FIG. 1B, the image conversion unit 160 converts the image data $V_1$ into a planar image $V_P$ displayed on the screen 10.

As mentioned above, due to the 3D hologram generated by the transparent pyramid 120, the user views data displayed on the screen 10 all around the transparent pyramid 120, and knows about the operating state of the electronic device, and does not need to move to a certain position for viewing the screen 10.

The image data $V_1$ received by the above-mentioned image conversion unit 160 are image data, such as a logo, or a number, an image and a word used for displaying the operating state of the electronic device. However, the disclosure is not limited herein. Other image data suitable for performing displaying through the 3D hologram are also applied to the disclosure.

The sensor 180 is disposed on the movable support 140 to detect a movement state of the movable support 140, and then generates an image conversion triggering signal St to be output to the image conversion unit 160. In one embodiment, when the transparent pyramid 120 moves to the first location, as shown in FIG. 1A, the movable support 140 triggers the sensor 180 to generate the image conversion triggering signal St. The image conversion unit 160 immediately converts the image data $V_1$ to generate the holographic image $V_H$ displayed on the screen 10 after receiving the image conversion triggering signal St.

Figure 3:
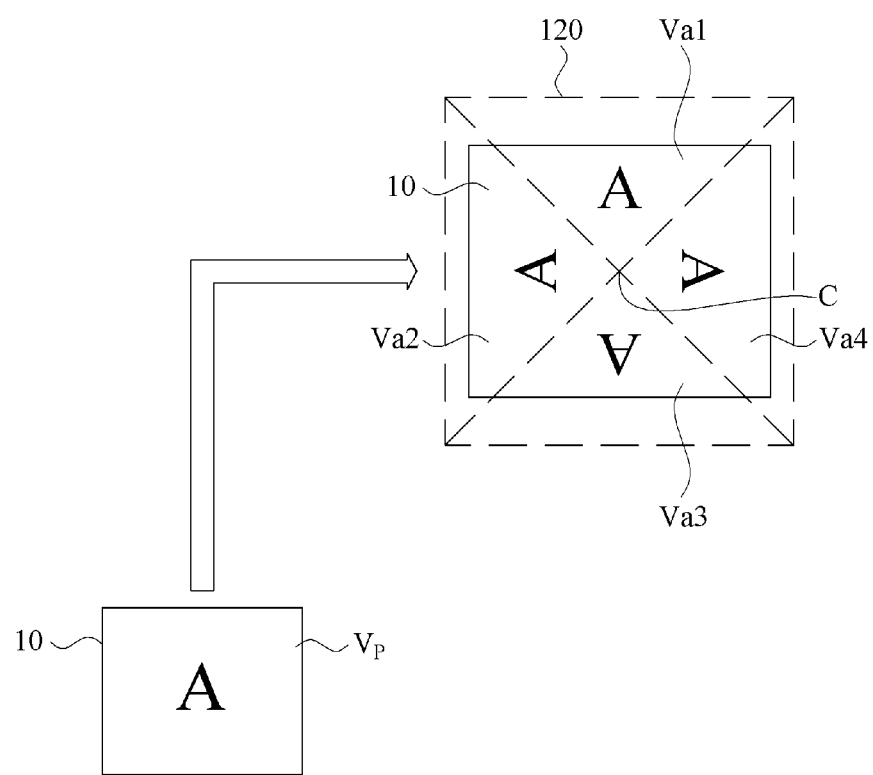
FIG. 3 is a schematic view of an embodiment of a holographic image generated by an image conversion unit.

Secondly, in the embodiment, the transparent pyramid 120 is a regular quadrangular pyramid, and its bottom surface is a right quadrangle. Due to a shape of the bottom surface of the transparent pyramid 120, referring to FIG. 3 at the same time, the image conversion unit 160 coverts the image data into four corresponding sub-images Va1, Va2, Va3 and Va4 to form the holographic image. The four sub-images are symmetrical about the center C of the screen. The converting process includes the method of rotating, zooming and stretching of the image, and is not limited herein.

Figure 4:
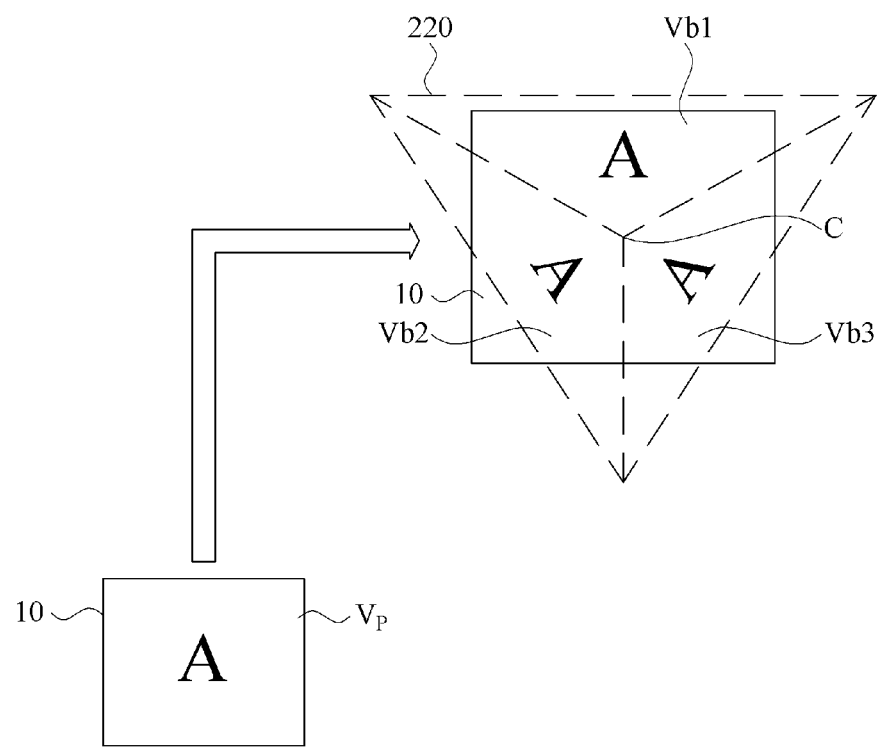
FIG. 4 is a schematic view of another embodiment of the holographic image generated by the image conversion unit.

However, the disclosure is not limited herein. In another embodiment, the bottom surface of the transparent pyramid 120 is a rectangle or a rhombus. Besides, the transparent pyramid 120 is not limited to a quadrangular pyramid, either. In another embodiment, as shown in FIG. 4, the transparent pyramid 120 is a regular triangle pyramid, and its bottom surface is a regular triangle. Due to a shape of the bottom surface of the transparent pyramid 120, the image conversion unit 160 converts the image data into three corresponding sub-images Vb1, Vb2 and Vb3 to form the holographic image.

Figure 5:
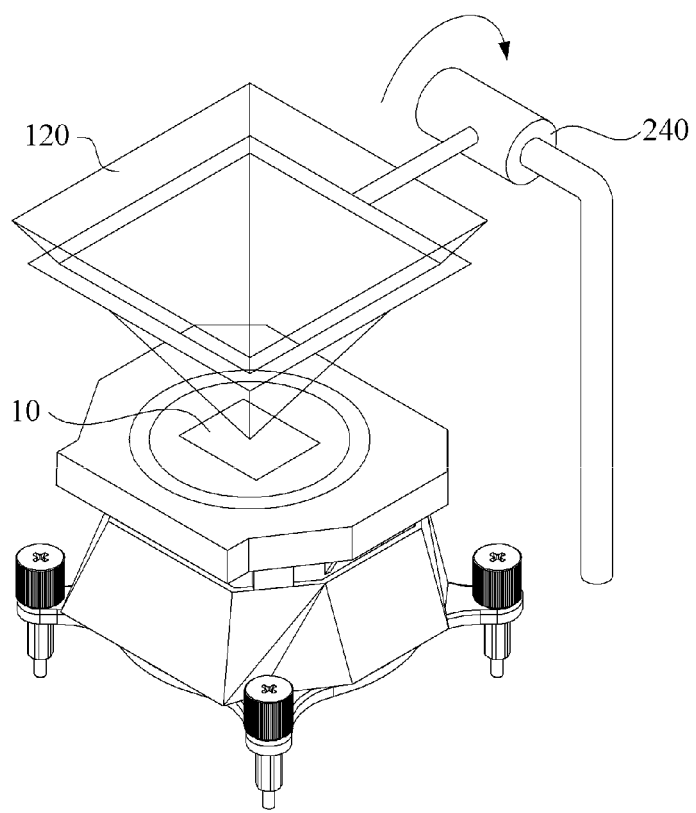
FIG. 5 is a three-dimensional schematic view of another embodiment of the displaying device of the disclosure.

FIG. 5 is a three-dimensional schematic view of another embodiment of the displaying device of the disclosure. Different from the embodiments of FIG. 1A and FIG. 1B, the movable support 140 moves the transparent pyramid 120 between the first location and the second location in a transverse moving manner, and the movable support 240 of the embodiment moves the transparent pyramid 120 between the first location and the second location in a flipping manner. FIG. 5 displays that the transparent pyramid 120 is positioned at the first location.

In comparison to the traditional electronic device only showing operating information by software, the displaying device of the disclosure converts image data into a 3D hologram to show according to a requirement of a user. The user directly views an operating state of the electronic device, and it increases the convenience.

The foregoing descriptions are merely preferred embodiments of the disclosure and are not intended to limit the disclosure in any way. Any person skilled in the art can make any form of equivalent replacement or modification to the technical means and technical contents disclosed by the disclosure without departing from the scope of the technical means of the disclosure, and such equivalent replacement or modification does not depart from the contents of the technical means of the present disclosure and still falls within the protection scope of the disclosure.

What is claimed is:

1. A displaying device, adapted to a screen, comprising:
a transparent pyramid;
a movable support, connected to the transparent pyramid, and configured to make the transparent pyramid move between a first location and a second location, wherein the first location is on the screen and the second location is away from the screen; and
an image conversion unit, configured to receive image data, wherein when the transparent pyramid moves to the first location, the image conversion unit converts the image data to a holographic image displayed on the screen;
wherein the transparent pyramid generates a 3D hologram based on the holographic image;
wherein when the transparent pyramid is located at the second location, the image conversion unit converts the image data into a planar image displayed on the screen;
wherein the movable support moves the transparent pyramid between the first location and the second location along a direction parallel to the screen.

2. The displaying device according to claim 1, wherein when the transparent pyramid moves to the first location, the transparent pyramid is inversely disposed at a center of the screen.

3. The displaying device according to claim 1, wherein the image data is an image, a number, a word or a logo.

4. The displaying device according to claim 1, wherein one bottom surface of the transparent pyramid is a triangle or a quadrangle.

5. The displaying device according to claim 1, further comprising a sensor disposed on the movable support to detect a movement state of the movable support.

* * * * *